United States Patent
Phillips

(10) Patent No.: US 11,521,188 B2
(45) Date of Patent: *Dec. 6, 2022

(54) USING A THIRD PARTY DYNAMIC QR CODE ON A PERSONAL MOBILE DEVICE TO COMPLETE A TRANSACTION AT AN ATM

(71) Applicant: Capital One Services, LLC, McLean, VA (US)

(72) Inventor: Jeremy J. Phillips, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,257

(22) Filed: Jun. 21, 2021

(65) Prior Publication Data

US 2021/0357890 A1 Nov. 18, 2021

Related U.S. Application Data

(63) Continuation of application No. 16/877,091, filed on May 18, 2020, now Pat. No. 11,074,562.

(51) Int. Cl.
*G06Q 20/10* (2012.01)
*G06Q 20/40* (2012.01)
*G06Q 20/32* (2012.01)

(52) U.S. Cl.
CPC ..... *G06Q 20/1085* (2013.01); *G06Q 20/3274* (2013.01); *G06Q 20/4014* (2013.01); *G06Q 20/4093* (2013.01)

(58) Field of Classification Search
CPC .............. G06Q 20/1085; G06Q 20/3274
(Continued)

(56) References Cited

U.S. PATENT DOCUMENTS 8,332,320 B2 12/2012 Singh
8,556,164 B1 10/2013 Freedman et al.
(Continued)

FOREIGN PATENT DOCUMENTS

TW 389883 B1 4/2020
WO 0209001 A1 1/2002
(Continued)

OTHER PUBLICATIONS

Becky Yerak. "Talking with the ATM: Wintrust Financial is Unveiling 'Cardless Cash' Machines to Let Consumers Withdraw Money with Smartphones, a Move That Could Boost Security." Chicago tribune (1963) 2015: n pag. Print (Year: 2015).
(Continued)

*Primary Examiner* — Allyson N Trail
(74) *Attorney, Agent, or Firm* — Sterne, Kessler, Goldstein & Fox P.L.L.C.

(57) ABSTRACT

Disclosed herein are system, method, and computer program product embodiments for using a third party dynamic QR code on a personal mobile device to complete a transaction at an ATM. The customer may stage a transaction using a mobile application on a mobile device. Upon the staged transaction being authenticated and approved, a machine readable image may be transmitted to the mobile device. When the customer visits the ATM, the machine readable image on the mobile device may be captured by the ATM and sent to an application server from the ATM. The application server may associate the ATM with the staged transaction that is staged using the mobile application, and send instructions to the ATM to dispense cash according to the staged transaction.

20 Claims, 9 Drawing Sheets

(58) Field of Classification Search
USPC .......................................................... 235/379
See application file for complete search history.

(56) References Cited

U.S. PATENT DOCUMENTS

| | | | |
|---|---|---|---|
| 8,769,304 | B2 | 7/2014 | Kirsch |
| 8,935,769 | B2 | 1/2015 | Hessler |
| 8,990,909 | B2 | 3/2015 | Kelley |
| 9,010,627 | B1 | 4/2015 | Prasad et al. |
| 9,311,632 | B1 | 4/2016 | Dent |
| 9,412,106 | B2 | 8/2016 | Laracey |
| 9,756,042 | B2 | 9/2017 | Bicer |
| 9,916,736 | B2 | 3/2018 | Block et al. |
| 9,922,370 | B2 | 3/2018 | Kobres et al. |
| 10,269,016 | B2 | 4/2019 | Votaw et al. |
| 10,445,711 | B1 | 10/2019 | Arumugam |
| 10,984,419 | B2 | 4/2021 | Ruparelia et al. |
| 11,074,562 | B1 | 7/2021 | Phillips |
| 2011/0055084 | A1 | 3/2011 | Singh |
| 2013/0016173 | A1 | 1/2013 | Johnson et al. |
| 2013/0018788 | A1 | 1/2013 | Johnson et al. |
| 2013/0110717 | A1 | 5/2013 | Kobres |
| 2014/0263618 | A1 | 9/2014 | McCarthy et al. |
| 2014/0324610 | A1 | 10/2014 | Ans et al. |
| 2015/0058215 | A1 | 2/2015 | Johnson |
| 2016/0019510 | A1 | 1/2016 | Guntupalli |
| 2016/0162855 | A1 | 6/2016 | Johnson et al. |
| 2016/0180307 | A1 | 6/2016 | Laracey |
| 2017/0124544 | A1 | 5/2017 | Recriwal et al. |
| 2017/0337782 | A1 | 11/2017 | Nelson, Jr. et al. |
| 2018/0060845 | A1 | 3/2018 | Monaghan |
| 2019/0073663 | A1 | 3/2019 | Jamkhedkar et al. |
| 2019/0108731 | A1 | 4/2019 | Hazard et al. |
| 2019/0213673 | A1 | 7/2019 | McCarthy et al. |
| 2020/0005263 | A1 | 1/2020 | Arora et al. |
| 2020/0356979 | A1 | 11/2020 | Dadhaniya et al. |
| 2021/0150497 | A1 | 5/2021 | Phillips et al. |
| 2021/0158315 | A1 | 5/2021 | Phillips et al. |
| 2021/0357926 | A1 | 11/2021 | Laracey |

FOREIGN PATENT DOCUMENTS

| | | |
|---|---|---|
| WO | 2015011655 A1 | 1/2015 |
| WO | 2018076443 A1 | 5/2018 |
| WO | 2019058264 A1 | 3/2019 |

OTHER PUBLICATIONS

"Diebold Delivers The Consumer Banking Experience of the Future with Two New Concept ATMs." Michigan Banker 27.12 (2015): 19—. Print. (Year: 2015).

Michael Scheibach. "The Case for Cardless Cash." Bank News 117.3 (2017): 26—. Print (Year: 2017).

Gamble, R. H. (2018). What's coming for ATMs? Credit Union Management, 41(11), 22-24. Retrieved from https://www.proquest.com/trade-journals/whats-coming-atms/docview/2126522498/se-2?accountid=14753 (Year: 2018).

International Search Report and Written Opinion directed to related International Patent Application No. PCT/US2021/032927 dated Jun. 21, 2021; 6 pages.

Weisbaum, H., Banks putting human tellers in ATMS, NBC News, https://www.nbcnews.com/technology/banks-putting-human-tellers-atms-6C10791363; First Published Aug. 4, 2013.

U.S. Appl. No. 16/877,091, "Using a Third Party Dynamic QR Code on a Personal Mobile Device to Complete a Transaction at an ATM", to Jeremy J. Phillips, filed May 18, 2020. pp. 1-62.

"Cardless ATM" article captured Feb. 9, 2022 at https//mastercard.us/en-us/business/issuers/manage-your-consumer-needs/cardless-atm.html.

Yurcan, B. (Mar. 20, 2018). Fifth third latest bank to enable cardless ATM access. American Banker Retrieved from https://www.proquest.com/newspapers/fifth-third-latest-bank-enable-cardless-atm/docview/2015118467/se-2?accountid = 147 53 (Year: 2018).

Ahmad, N., A Aminurdin, M. R., & Mohd Helmy, A. W. (2016). AES card less automatic teller machine (ATM) biometric security system design using FPGA implementation. IOP Conference Series. Materials Science and Engineering, 160 (1) doi:http://dx.doi.org/10.1088/1757-899X/160/1/012113 (Year: 2016).

Paydiant gets patent for conducting transactions at ATMs using smartphone. (2014). Telecomworldwire, Retrieved from https://www.proquest.com/trade-journals/paydiant-gets-patent-conducting-transactions-at/docview/1491270632/se-2?accountid = 14 753 (Year: 2014).

Grosman, p. Wells to allow ATM withdrawals through mobile wallets. American Banker, [s. L], v. 182, n. 195, p. 1, 2017. Disponf vel em:https://search.ebscohost.com/login.aspx?direct=true&db=bth&AN = 125586390&site=ehost-l ve&scope=site. Acessoem: Mar. 18, 2022. (Year: 2017).

FIG. 2C

Choose Amount

Get cash from:
Checking Account ....0987
$11,435.12 Available

Amount:
$20

Choose Amount — Done $20
$40
$60

FIG. 2D

Confirm Details

Get cash from:
Checking Account ....0987
$11,435.12 Available

Amount:
$60

Confirm Details

USING A THIRD PARTY DYNAMIC QR CODE ON A PERSONAL MOBILE DEVICE TO COMPLETE A TRANSACTION AT AN ATM

CROSS-REFERENCE TO RELATED APPLICATIONS

This application is a Continuation Application of U.S. patent application Ser. No. 16/877,091, filed on May 18, 2020, the contents of which are incorporated herein in their entireties.

BACKGROUND

Automated teller machines (ATMs) have successfully served banking customers to complete their banking transactions without stepping inside the branch office and interact with a real human being. The customer can swipe or insert a bank issued ATM/Credit/Debit card at ATM and enter an associated personal identification number (PIN) to perform transactions such as withdrawing cash, depositing cash, or performing balance inquiries. These transactions at the ATM are not possible without the customer having the ATM/Credit/Debit card in his/her possession.

Employees of employers who collect cash upon delivery of items such as parcels or food are known as runners. The runners are required to deposit cash in the account of the employer. For the runners to deposit cash during normal banking hours interacting with a teller may be convenient but time-consuming. However, if the runner is not carrying an ATM/Credit/Debit card of the employer's account, it is impossible for the runner to deposit cash using an ATM.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 2C illustrates a screen of a mobile application according to an embodiment.

FIG. 2D illustrates a screen of a mobile application according to an embodiment.

The drawing in which an element first appears is typically indicated by the leftmost digit or digits in the corresponding reference number. In the drawings, like reference numbers may indicate identical or functionally similar elements.

DETAILED DESCRIPTION

Figure 1:
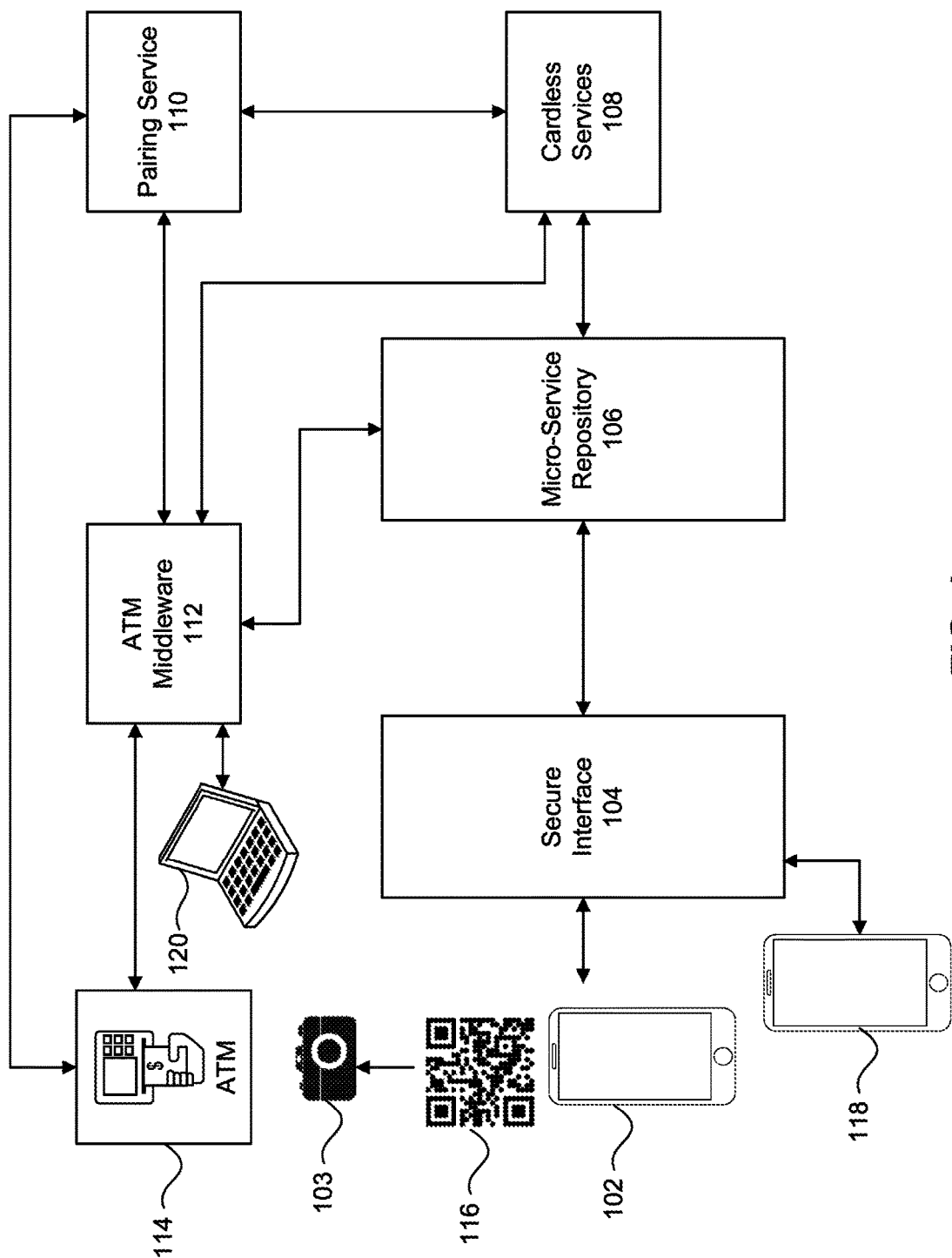
FIG. 1 illustrates a block diagram of an example environment in which systems and/or methods for using a third party dynamic quick response (QR) code on a personal mobile device to complete a transaction at an ATM may be implemented according to an example embodiment.

Smartphones have changed the lives of people to perform various acts, such as receiving news, shopping, entertainment, social life, banking, etc. People earlier were used to going inside the bank branch and interact with a teller to withdraw or deposit cash. Then, ATM came, and people can withdraw or deposit money at the ATM. People can also know an available balance in their accounts with the bank. But, with the smartphone, people can do many of the transactions that required them to leave their home earlier, now from their living room or bedroom. For example, a person has a bank account at a bank; then a person can download a mobile application on their mobile device. The mobile application allows the person access to his/her bank account with the bank. Using the mobile application, the person can deposit a cheque into their account by uploading an image of a front and a back of the cheque. The person can also transfer money from one account to another account, to another person, and/or to another account at a different bank, etc. The mobile device on which the mobile application may be downloaded may be a smartphone, a phone, a tablet, a laptop, a desktop, or any other computing device that may allow interacting with a bank account using a mobile application or a native browser application of the mobile device.

For example, a bank account holder has downloaded a mobile application on his/her mobile device. Using the mobile application, the bank account holder can perform operations as described above. However, using the mobile application, the bank account holder can not receive cash from or deposit cash to his/her bank account. That would require the bank account holder to go to the bank or an ATM to receive or deposit cash to his/her bank account. Additionally, performing transactions such as withdraw or deposit cash, check account balance, etc., at the ATM, a bank-issued ATM/Debit/Credit card is required to authenticate and gain access to the bank account. However, if the person is not carrying the bank issued ATM/Credit/Debit card, no transaction can be performed at the ATM.

In this disclosure, the bank account holder may be an authorized user of the bank account. The authorized user may be the runner, a person who is required to deposit cash in the employer's bank account, as described above. An owner of the account, for example, an employer, may provide information of one or more runners as authorized users of the account. The information provided for the authorized users of the account may include phone numbers of the mobile devices used by the runners, personal details of the runners, user id and password associated with the authorized user account. The personal details of the runners may include social security number, date of birth, place of birth, etc. Accordingly, the runner may download the mobile application to interact with the account from his/her mobile device. The runner may log in to the mobile application and interact as the owner of the account. However, the allowed features/operations may be limited for the mobile application installed on the mobile device of the runner. For example, the policy set by the bank account holder may limit withdrawal of the money based on the amount, frequency, and/or time, etc. The bank account holder and the authorized user may also be referenced as a mobile application user in this disclosure.

The present disclosure makes a transaction at the ATM possible without the use of the bank issued ATM/Debit/Credit card. By way of a non-limiting example, the mobile application downloaded on the mobile device may allow the mobile application user to stage a transaction to be performed later at the ATM. Further, examples provided in this disclosure may refer to a mobile phone as a mobile device, but this disclosure is not limited to the phone or the mobile phone as a mobile device.

Since the transaction is staged in advance, the mobile application user may not be required to use the bank issued ATM/Credit/Debit card at the ATM. The mobile application user may be authenticated using the login and/or password to access the mobile application on the mobile device. The mobile application user may be authenticated using biometric information such as fingerprint, retina/iris scanning, facial recognization, etc. The mobile application user may be authenticated using two-factor authentication in which a code may be sent to a mobile device associated with the bank account, and the code sent to the mobile device associated with the bank account may be required to send back from the mobile device for verification.

After successful authentication of the mobile application user, the mobile application user may stage the transaction, which may be referenced as a prestaged transaction in this disclosure because the transaction is staged using the mobile application to be completed later at the ATM. The prestaged transaction, for example, maybe for withdrawing cash from a savings account. Using the mobile application, the mobile application user may select the savings account and amount of money to withdraw from the savings account. As the mobile application user selects the amount of money to withdraw from the savings account, the mobile application may send one or more messages to an application server, which provides the mobile application access to the bank account. If there is sufficient balance, withdrawal of the requested money may be preapproved. The mobile application user may then be instructed to go to an ATM and use his/her phone used in prestaging the transaction to collect the requested money.

Because the mobile application user has used his/her phone, the application server may send a machine readable image to the phone used to set up the prestaged transaction. The machine readable image may be a bar code or a Quick Response (QR) code. The machine readable image sent to the phone used to set up the prestaged transaction may uniquely identify the prestaged transaction. Further, the machine readable image may be periodically refreshed by the application server.

Accordingly, when the user visits an ATM to complete the prestaged transaction, the prestaged transaction may now be required to associate with the ATM. Once the prestaged transaction is associated with the ATM, the ATM may be instructed to dispense the cash requested in the prestaged transaction.

In order to associate the prestaged transaction with the ATM, the mobile application user may be instructed to present the machine readable image sent to the phone before a camera of the ATM. The camera of the ATM may be integrated with a body of the ATM, or the camera may be in the same enclosure as the ATM. As the user presents the machine readable image before the camera, the machine readable image on the phone may be captured by the ATM. The ATM may then send the captured machine readable image along with an ATM identifier to the application server. The ATM identifier uniquely identifies the ATM. The ATM identifier also identifies a physical location of the ATM, i.e., bank branch, navigable geographical address, and/or network identification of the ATM, etc. Therefore, when a message comprising the ATM identifier and the machine readable image is received at the application server from the ATM, the application server may associate the prestaged transaction and the ATM based on the machine readable image captured by the camera of the ATM and the ATM identifier. The application server may then send one or more commands to the identified ATM to complete the identified prestaged transaction. As a result, the mobile application user may receive the requested money from the ATM without using the bank issued ATM/Credit/Debit card.

Various embodiments to use a QR code on a mobile device to complete a transaction at an ATM, as described above, will now be discussed with respect to the corresponding figures. The disclosure is not limited to an ATM to release the cash, but this disclosure applies to any kiosk to serve a product or any transaction through the use of a QR code on a mobile device, based on the prestaged transaction. Further, the disclosure is not limited to the prestaged transaction setup using the mobile application by the mobile application user alone.

FIG. 1 illustrates a block diagram of an example environment 100 in which systems and/or methods described herein may be implemented. The environment 100 may include a user equipment (UE) device 102. The user equipment device 102 may be a mobile phone, a smartphone, a tablet, a laptop, or any other computing device of the customer. The customer may download a mobile application on the UE device 102. The mobile application on the UE device 102 may allow the customer to set up a transaction in advance for later execution at an automated teller machine (ATM) 114. The transaction set up in advance for later execution at the ATM 114 may be referenced as a prestaged transaction in this disclosure. In some embodiments, instead of the mobile application on the UE device 102, the customer may set up the prestaged transaction using a web application on the UE device.

In some embodiments, the ATM 114 may include a keyboard, a card reader, a display, a slot to dispense cash, and a slot to receive cash, a cheque, or an envelope. The ATM 114 may also include a camera 103 installed on the body of the ATM 114. The camera 103 may be integrated with the body/frame of the ATM 114. The ATM 114 may include a fingerprint pad, and/or another appropriate system to collect biometric or other information from the customer for various purposes, including, for example, authentication of the user, etc.

In some embodiments, the ATM 114 may include a display screen, a slot to dispense cash, and a slot to receive cash, a cheque, or an envelope. The ATM 114 may include one or more physical buttons for the customer to request for help. The ATM 114 may also display one or more buttons that are clickable displayed on the display screen of the ATM 114.

In some embodiments, the environment 100 may include another user equipment (UE) device 118. Similar to the UE device 102, the UE device 118 may be a mobile phone, a smartphone, a tablet, a laptop, or any other computing device of the customer. The UE device 118 may also include a camera, which may be integrated with the UE device 118 or a pluggable device into the UE device 118. The UE device 118 may be with an associate or a customer care agent, for example, of a bank to assist the customer at the ATM 114. The UE device 118 may have a mobile application installed on it that may be different from the mobile application installed on the UE device 102 of the customer. The associate or the customer care agent may thus assist the customer as described in detail below. The mobile application on the UE device 118 may be referenced as a customer care mobile application in this disclosure.

In some embodiments, both the UE devices 102 and 118 may communicate with a micro-service repository 106 over a secure interface 104. The secure interface 104 may be a firewall or a virtual private network. The secure interface 104 may be a secure session layer on the UE devices 102 and 118 and the micro-service repository 106 for secure communication. By way of non-limiting example, the mobile application on the UE device 102 and/or the customer care mobile application may interact with a bank account by sending and receiving messages with the micro-service repository and cardless services 108 over the secure interface 104.

In some embodiments, the micro-service repository 106 may be an application, which receives messages from the UE devices 102 and/or 118 for further processing. The micro-service repository 106 may implement business logic for various features and/or functionality. The micro-service repository 106 may be an application program interface (API) that processes messages received from the ATM 114, and the UE devices 102 and/or 118. The micro-service repository 106 may also send messages to the ATM 114, and the UE devices 102 and/or 118 based on the processed received messages. The micro-service repository 106 may be installed on one or more servers, which may be a server described below with reference to FIG. 4.

In some embodiments, the micro-service repository 106 may send the received messages after initial processing to cardless services 108. The cardless services 108 may further process the received messages. The cardless services 108 may have access to one or more databases, which may include a record(s) of an account(s) of the customer(s).

In one example, the UE device 102 may set up a prestaged transaction to withdraw sixty dollars from his bank account using a mobile application on the UE device 102. The UE device 102 may communicate with the micro-service repository 106 over the secure interface 104. The micro-service repository may receive one or more messages from the UE device 102 in connection with the prestaged transaction. The received message(s) from the UE device 102 may include for example an account number, a PIN, a transaction type (withdraw or deposit cash), amount of the transaction. The received message(s) from the UE device 102 may also include an identifier of the UE device 102, or the UE device 102 may include the identifier of the UE device 102 in each message to the micro-service repository 106. The micro-service repository may send the received message(s) from the UE 102 after initial processing to the cardless services 108 for further processing. The further processing may include verification of the PIN, verification of the UE device, and/or authorization of the prestaged transaction.

In some embodiments, cardless services 108 allow mobile device 102 to interact with an ATM 114 without the need to have a physical ATM card as an authentication mechanism for the account holder. The cardless services 108 may verify that the same person who is an account holder owns a phone number associated with the UE device 102 associated with the prestaged transaction. The cardless services 108 may send one or more API messages to a phone service provider to retrieve ownership information of the phone number associated with the UE device 102. The retrieved ownership information from the phone service provider may be the name of the person to which the phone number may be registered. The cardless services 108 may verify that the name of the owner of the phone number associated with the prestaged transaction and the owner of the account associated with the prestaged transaction are same. The retrieved ownership may also include social security number, date of birth, an address, etc. to verify against the record(s) of the account associated with the prestaged transaction.

In some embodiments, after successful authentication of the prestaged transaction, the cardless services 108 may also verify other information depending on the transaction type before authorizing the prestaged transaction. The other information verified by the cardless services 108 may include transaction history of the account, available balance, a limitation(s) or a restriction(s) on a transaction(s) for the account, etc. The limitation may be a cash withdrawal limit, e.g., a maximum of two-hundred dollars withdrawal per day, only three transactions per day, etc. If the prestaged transaction is not in violation of any policy set for the account associated with the prestaged transaction, the prestaged transaction may be authorized, and an appropriate message may be sent to the UE device 102 via the micro-service repository 106 over the secure interface 104. The appropriate message sent to the UE device 102 may indicate the customer that the prestaged transaction is authorized and the user may visit any ATM to complete the transaction.

In some embodiments, the message may also include a list of ATM(s) based on a location of the customer. If the location service has been enabled on the UE device 102, message(s) between the UE device 102 and the micro-service repository 106 may include a location of the UE device 102. The location of the UE device 102 may be determined using Wi-Fi, and/or a global positioning system (GPS). The location of the customer, i.e., the UE device 102, may be used to prepare a list of ATMs based on the geographic proximity of each ATM from the location of the UE device 102. The location of the customer, i.e., the UE device 102 may also be used to determine if the UE device 102 is at the same location as the ATM 114.

In some embodiments, the ATM 114 may be communicatively coupled with the pairing service 110, the cardless services 108, and the micro-service repository 106 via an ATM middleware 112. The ATM middleware 112 similar to the secure interface 104 enables secure communication with the ATM 114 from the pairing service 110, the cardless services 108, and/or the micro-service repository 106. The pairing service 110 and the ATM 114 are shown to have a separate path to display machine readable image 116 on the ATM 114, the pairing service 110 and the ATM 114 may communicate via the ATM middleware 112 to send (periodically) the ATM identifier to the ATM 114 from the pairing service 110.

In some embodiments, when the customer approaches an ATM after the setup of the prestaged transaction using the mobile application on the UE device 102, the mobile application may display a machine readable image 116 on the screen of the UE device 102. The machine readable image 116 may be a barcode. The barcode may be a quick response (QR) code. The barcode displayed on the display of the UE device 102 may be one-dimensional (1D) or two-dimensional (2D). The 2D barcodes may include rectangle, dots, hexagons, or any other geometric pattern. The machine readable image 116 may uniquely identify the prestaged transaction. For each prestaged transaction, a unique machine readable image may be generated by a pairing service 110.

Further, for the prestaged transaction, the machine readable image may be refreshed periodically to avoid fraud. Thus, the machine readable image may be valid, for example, thirty seconds. And, so at every thirty seconds, a new machine readable image may be generated that may be used to identify the prestaged transaction.

In some embodiments, the pairing service 110 may generate the machine readable image when requested by the cardless services 108 upon successful authorization of the prestaged transaction set up via the mobile application on the UE device 102. The pairing service 110 may send the machine readable image to the UE device 102 via cardless service 108 and micro-service repository 106 over the secure interface 104.

In some embodiments, the pairing service 110 may generate the machine readable image for the prestaged transaction and send the generated machine readable image to the cardless services 108. The cardless services 108 may then send the machine readable image to the UE device 102 via the micro-service repository 106 over the secure interface 104. The pairing service 110 may also periodically generate a new machine readable image associated with the prestaged transaction to avoid fraud. The pairing service 110 may also store information of the machine readable image and the associated prestaged transaction as a pair in a database (not shown). Because each machine readable image generated by the pairing service 110 is valid for a configurable time period, the pairing service 110 may update the record of the association of the prestaged transaction and the machine readable image. The pairing service 110 may be a process on one or more computing devices. The pairing service may be implemented as a software, a hardware, and/or a module.

Accordingly, when the customer who has set up a prestaged transaction and is now at the ATM 114, the customer may launch the mobile application on the UE device 102. The mobile application on the UE device 102 may display the machine readable image generated by the pairing service and transmitted to the UE device 102. The camera 103 may always be on and may be looking for the machine readable image to scan. As the UE device 102 displays the machine readable image 116, the camera 103 may scan the machine readable image 116 and may send an API message(s) to the micro-service repository over a secure connection created by the ATM middleware 112. The API message(s) from the ATM 114 may also include an ATM identifier that may be used to identify the ATM and physical location of the ATM. The pairing service 110 may periodically assign a different ATM identifier to the ATM 114 then assigned previously. The pairing service 110 may transmit the current ATM identifier to the ATM 114 via the ATM middleware 112.

In some embodiments, the UE device 102 may be required to have a location service enabled and send a current location of the UE device 102 while communication to the micro-service repository 106 and/or cardless services 108 over the secure interface 104. The current location of the UE device 102 may be used to detect fraud, for example, by comparing the current location of the UE device 102 to the physical location of the ATM 114 as determined based on the ATM identifier. If the physical location of the ATM 114 and the current location of the UE device 102 do not match, the prestaged transaction may not be permitted to complete at the ATM 114.

If the prestaged transaction has been denied, the appropriate message sent to the UE device 102 may indicate the prestaged transaction has been denied, and may indicate what the customer can do to resolve the issue that caused denial of the prestaged transaction, for example, call a customer care number, or chat with a customer care agent, etc.

In some embodiments, the ATM 114 may be equipped with a Bluetooth and/or Wi-Fi system for periodic transmission of a beacon signal(s). Therefore, when the customer with UE device 102 comes within proximity of the reach of the beacon signal(s), a message may be sent to the UE device 102 as a notification to complete the prestaged transaction or any other transaction at the ATM 114.

In some embodiments, the prestaged transaction may be associated with a device identifier of the UE device 102. The device identifier of the UE device 102 may be an international mobile equipment identity (IMEI), a mobile equipment identifier (MEID), an electronic serial number (ESN), etc. The device identifier of the UE device 102 may be used to search or identify the prestaged transaction. For example, the prestaged transaction fails at the ATM 114 because there is not sufficient cash at the ATM 114. The customer may be displayed a message on the display of the ATM 114 and/or the UE device 102 to indicate there is not sufficient cash. However, the customer may be willing to take less than the amount requested in the prestaged transaction. The customer may seek assistance from the customer care agent at the UE device 118 from an option on the mobile application. The message sent from the UE device may include the device identifier, which may be used to search and/or verify the prestaged transaction. The customer care agent at the UE device 118 then assists the customer to resolve the issue and complete the prestaged transaction at the ATM 114.

The machine readable image 116 on the display of the UE device 102 is unique and may be associated with the prestaged transaction. The machine readable image may also include details of the prestaged transaction as data. Based on the scanned image received in the message from the ATM 114, the micro-service repository and/or the cardless services 108 may identify the prestaged transaction. Further, the message from the ATM 114 may also include the ATM identifier assigned to the ATM by the pairing service 110. Based on the ATM identifier received in the message from the ATM 114, the ATM and its physical location may be determined using the pairing service 110. The pairing service 110 may keep an up-to-date record of the machine readable image being displayed on the UE device 102, associated prestaged transaction, and for the time period for which the machine readable image is/was displayed. The pairing service 110 may keep an up-to-date record of the ATM identifier assigned to each ATM and the time period for which the assigned ATM identifier is valid. Accordingly, the micro-services repository 106 and/or the cardless services 108 may correctly identify the prestaged transaction and the corresponding ATM at which the customer is to complete the prestaged transaction.

If the scanned image and the ATM identifier received in the message from the ATM 114 matches with the record of the pairing service 110, the pairing service may provide details of the ATM identifier and the prestaged transaction to the cardless services 108, so that the cardless services 108 may communicate with the ATM, for example, the ATM 114, to complete the prestaged transaction. The communication to the ATM 114 may be via the ATM middleware 112, and may through micro-service repository 106. Accordingly, the cardless services 108 and/or the micro-service repository 106 may send one or more API messages to the ATM 114 to dispense cash according to the authorized prestaged transaction. If the prestaged transaction is for a cash deposit, the API message to the ATM 114 from the micro-service repository 106 and/or the cardless services 108 may be to open the slot to receive cash, a cheque, and/or an envelope. The API message to the ATM 114 may also include commands to verify cash deposit, a signature on the cheque, etc., and print a receipt.

In some embodiments, if execution of the prestaged transaction fails at the ATM 114, the cardless service 108 and/or the micro-service repository 106 may send a message to the UE device 102 and/or the ATM 114. The message to the UE device 102 and/or the ATM 114, when the execution of the prestaged transaction fails, may ask the customer how to seek assistance or help from a customer care agent. The customer may seek assistance from the customer care agent using the one or more physical buttons on the ATM 114 or the one or more clickable buttons displayed on the display screen of the ATM 114. When the customer requests for help from the customer care agent, the customer care agent at the UE device 118 may be notified by the ATM 114 by one or more API messages from the ATM 114 to the micro-service repository 106 and/or the cardless services 108 over the secure connection provided by the ATM middleware 112 and the secure interface 104.

The customer care agent at the UE device 118 may assist the customer using a mobile application installed on the UE device 118 to assist customers. The customer care agent at the UE device 118 may set up a voice/video communication with the customer to resolve issues. The customer care agent may verify information of the customer using past transaction history, personal details of the customer that the customer has provided earlier, prepopulated security questions and answers, verifying personal documents, etc. The personal details of the customer that the customer has provided earlier include, for example, a social security number (SSN), date of birth, place of birth, marriage anniversary, name and/or other personal details of family members, residential and/or business address, etc. The personal documents that may be verified by the customer care agent at the UE device 118 may be a driver's license, a passport, etc. Upon successful authentication of the customer, the customer care agent at the UE device 118 may send an appropriate API message(s) to the ATM 114 via the micro-service repository 106 and/or the cardless services 108 over the secure connection provided by the secure interface 104 and the ATM middleware 112 to complete the prestaged transaction. The customer care agent at the UE 118 may update the account associated with the prestaged transaction to indicate the override of the automatic process flow, which may provide the customer benefit of not having the problem at the ATM 114 again for a configurable period of days, for example, thirty days. By way of non-limiting example, the customer is stepped up for thirty days. The customer care agent at the UE 118 may update the account with a token that may expire after the configurable period of days.

In some embodiments, the environment 100 may include an ATM admin console 120 communicatively coupled with the ATM 114 via the ATM middleware 112. Using the ATM admin console 120, a bank associate or a customer care agent may securely send instruction(s) or command(s) to the ATM 114 to complete the prestaged transaction. The ATM admin console 120 may select an ATM from a plurality of ATMs to securely send the instruction(s) or the command(s) to assist customers in need of help to complete the prestaged transaction or any transaction at the ATM. The ATM admin console may be located at a remote bank facility, such as a customer care center by way of non-limiting example.

As described earlier, the ATM 114 may include one or more physical button or clickable button on the display of the ATM 114 for the customer to request help from the customer care agent. While completing the prestaged transaction or any transaction, the customer may request help from the customer care agent using the physical button or clickable button on the display of the ATM 114. By way of non-limiting example, the customer has setup the prestaged transaction, but when the customer arrived at the ATM 114, the customer forgot to bring the mobile device used to setup the prestaged transaction. The customer in such case cannot complete the prestaged transaction without help from the customer care agent.

Accordingly, when the customer requests help, the customer care agent may receive a call or a distress signal from the ATM. The customer care agent may answer the call or the distress signal from the ATM, and authenticate the customer using security questions on the profile of the customer on bank records. The customer care agent may also authenticate the customer asking questions to the customer based on recent transaction history. The customer care agent may also authenticate the customer requesting the customer to show an identification document such as driver's license, passport, etc. The customer care agent may use video camera at the ATM 114 to verify the identification document and presence of the customer at the ATM 114. Upon successful authentication of the customer and verification of the customer's presence at the ATM 114, the customer care agent may securely send the instruction(s) or the command(s) to the ATM to complete the prestaged transaction or the transaction for which the customer requested help from the customer care agent.

Figure 2A:
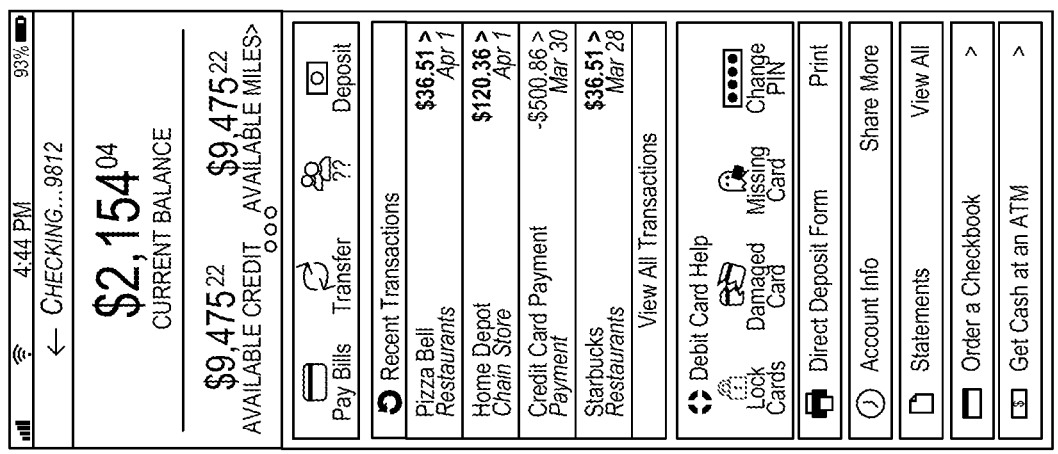
FIG. 2A illustrates a screen of a mobile application according to an embodiment.

FIG. 2A illustrates a screen of a mobile application at the UE device 102 according to an embodiment. The screen shown in FIG. 2A may be displayed on the UE device 102 when the customer launches the mobile application and completes the login process for the mobile application. To complete the login process of the mobile application, the customer may enter a user id and password. The user id may be a phone number, an email address, or an alphanumeric string. The customer may also complete the login process using biometric information such as a fingerprint, a thumbprint, or a scan of an iris. The login process may also require two-factor authentication, in which a code may be sent to a phone number associated with the combination of user id and password. The customer then enters the received code to complete the login process. The screen shown in FIG. 2A may be displayed when the customer accesses the checking account associated with the account on the mobile application. The customer may check available balance, check available reward points/miles, pay bills, transfer money between different accounts at the bank, send money to another party/person, or deposit cheque using the camera of the UE device 102. The customer may also see recent transactions. The customer may set up a transaction to execute later at the ATM, i.e., the prestaged transaction described above, selecting "Get Cash at an ATM" option.

Figure 2B:
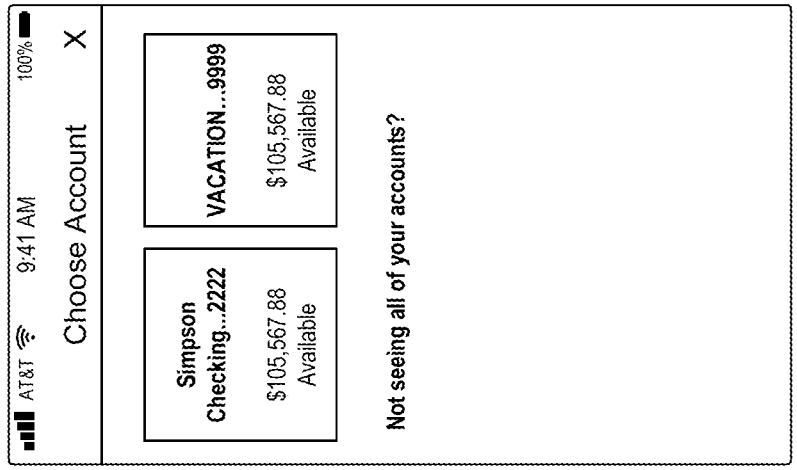
FIG. 2B illustrates a screen of a mobile application according to an embodiment.

FIG. 2B illustrates a screen of the mobile application at the UE device 102 according to an embodiment. Particularly, the screen shown in FIG. 2B may be displayed when the customer selects the option described above, with reference to FIG. 2A, to set up the prestaged transaction. The screen shown in FIG. 2B may be displayed when the customer selects an option to transfer money between accounts at the bank, deposit a cheque using the camera at the UE device 102, or send money to the other party/person. For example, the customer wants to set up the prestaged transaction to withdraw cash, and so the customer selects the account from which to withdraw the money. As shown in FIG. 2B, the customer has two accounts and may choose one of the account to withdraw money.

FIG. 2C illustrates a screen of the mobile application at the UE device 102 according to an embodiment. As shown in FIG. 2C, the customer selects a checking account to withdraw money using the prestaged transaction. The customer may select the amount to withdraw from prepopulated recommended options or may enter the amount manually.

FIG. 2D illustrates a screen of the mobile application at the UE device 102 according to an embodiment. As shown in FIG. 2D, the customer has selected the account to withdraw money from and the amount of money. The customer may be asked to confirm the transaction. When the customer confirms the transaction, for example, selecting or pressing "Confirm Details" on the screen of the UE device 102, as described the details of this transaction may be communicated to the micro-service repository 106 and/or the cardless services 108 over the secure interface 104 using one or more API messages. The micro-service repository 106 and/or the cardless services 108 may authorize the prestaged transaction as described above, and send a message to the UE device 102 as shown in FIG. 2E if the prestaged transaction is authorized.

Figure 2F:
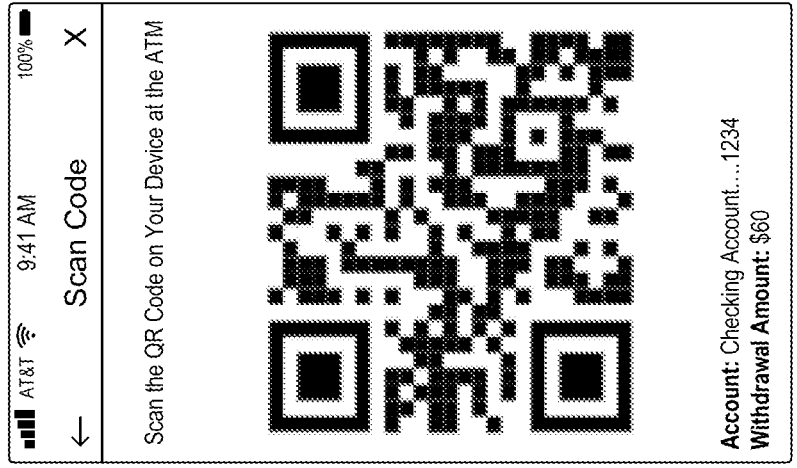
FIG. 2F illustrates a screen of a mobile application according to an embodiment.
Figure 2E:
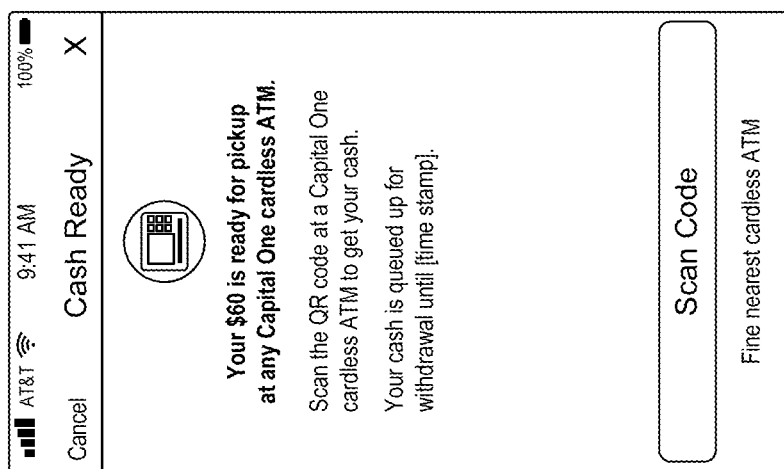
FIG. 2E illustrates a screen of a mobile application according to an embodiment.

FIG. 2E illustrates a screen of the mobile application at the UE device 102 according to an embodiment. As shown in FIG. 2E, the prestaged transaction set up by the customer is authorized, and, therefore, the customer may be asked what needs to be done next to complete the prestaged transaction. As shown in FIG. 2E, the message may indicate the prestaged transaction is valid up to a specific configurable time, which, for example, maybe 48 hours or 24 hours from the authorization of the prestaged transaction. The message may also indicate to the customer that the customer needs to go to an ATM and scan the machine readable image, for example, a QR code, being displayed on the ATM to complete the prestaged transaction.

FIG. 2F illustrates a screen of the mobile application at the UE device 102 according to an embodiment. The screen shown in FIG. 2F may be displayed when the customer is at the ATM 114 with the UE device 102. Because the customer has set up the prestaged transaction using the mobile application on the UE device 102, and the prestaged transaction has been authorized, the customer may be guided how to enable the camera 103 to scan the machine readable image 116 displayed on the UE device 102. The ATM 114 may also transmit Wi-Fi and/or Bluetooth beacon signals to send a notification to a mobile device, such as the UE device 102, to send a notification to invite the customer to use the ATM. Accordingly, when the UE device 102 arrives in the proximity of the ATM 114, the UE device 102 and the ATM 114 may communicate with each other using Wi-Fi or Bluetooth.

Figure 2H:
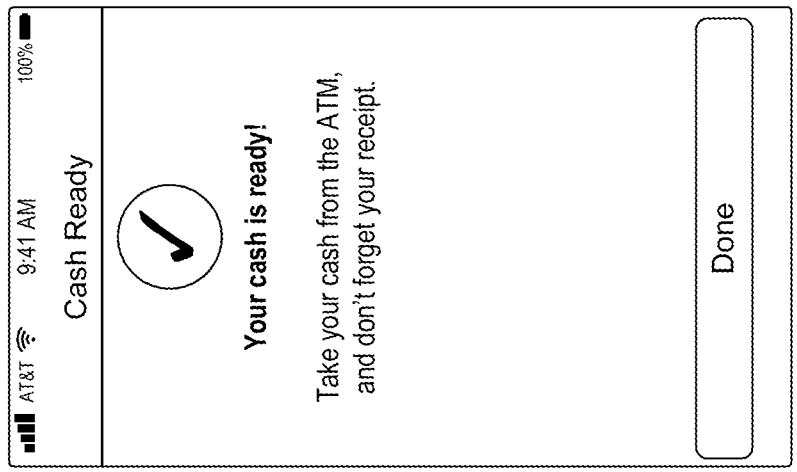
FIG. 2H illustrates a screen of a mobile application according to an embodiment.
Figure 2G:
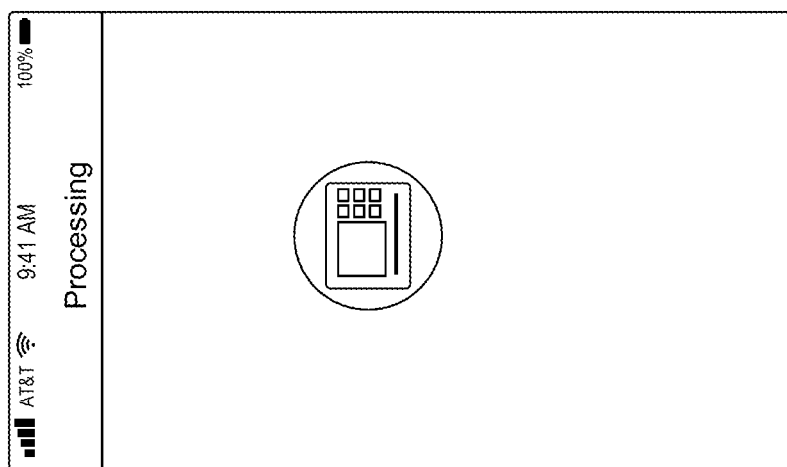
FIG. 2G illustrates a screen of a mobile application according to an embodiment.

FIG. 2G illustrates a screen of the mobile application at the UE device 102 according to an embodiment. Once the machine readable image 116 displayed on the UE device 102 is scanned by the camera 103, the screen shown in FIG. 2G may be displayed, which may provide the customer with an update of the status of the transaction being performed. The update of the status of the transaction being performed may be displayed on the display of the ATM 114 as well.

FIG. 2H illustrates a screen of the mobile application at the UE device 102 according to an embodiment. The screen shown in FIG. 2H may be displayed to remind the customer to take cash from the ATM 114. The customer may be reminded to take the cash by a similar message on the display of the ATM 114 as well.

Figure 3A:
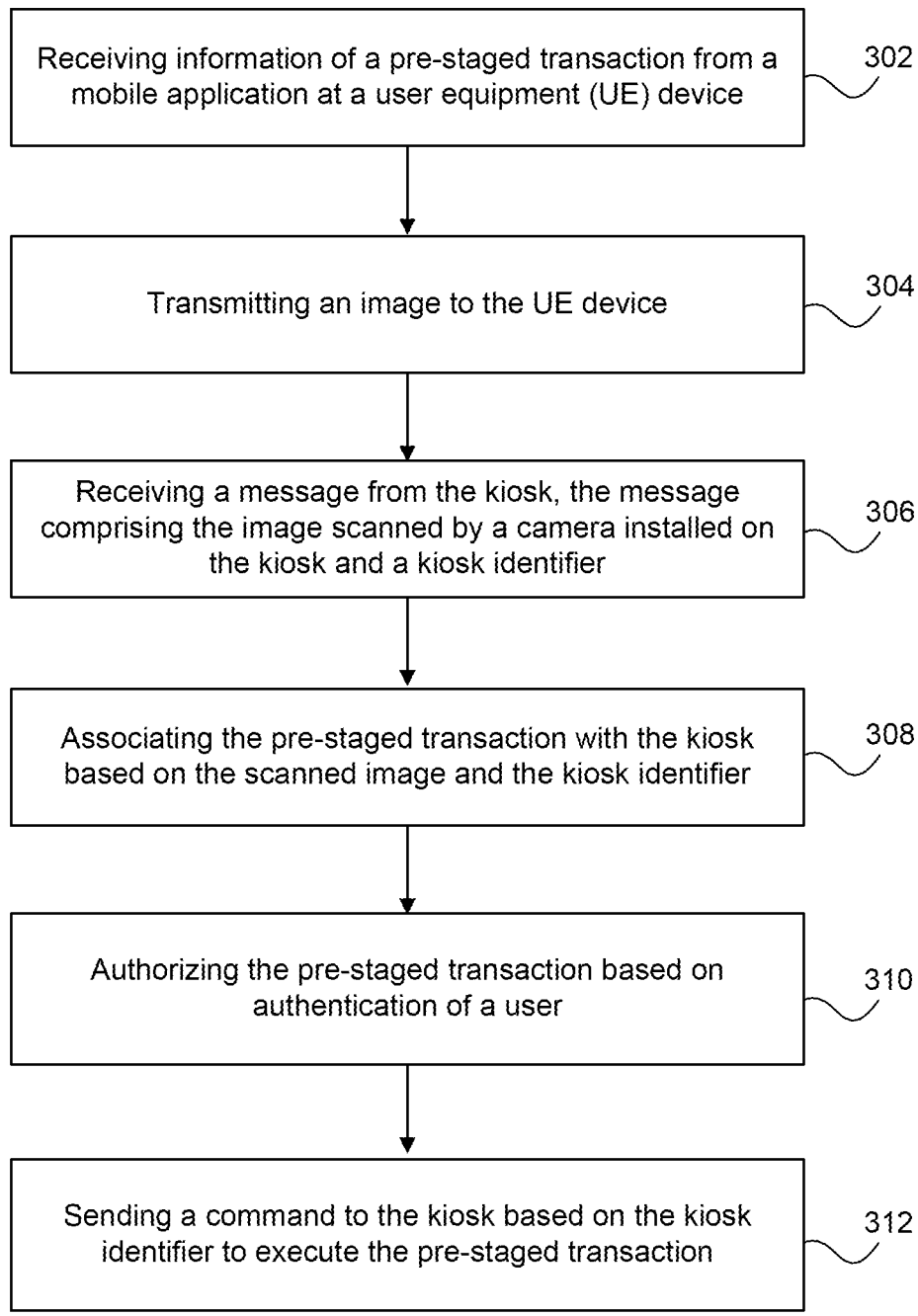
FIG. 3A illustrates a flowchart of a process for using a third party dynamic quick response (QR) code on a personal mobile device to complete a transaction at an ATM according to an embodiment.

FIG. 3A illustrates a flowchart 300 of a process for using a third party dynamic quick response (QR) code on a personal mobile device to complete a transaction at an ATM according to an embodiment. The micro-service repository 106, the cardless services 108, and the pairing services 110 may be on a single server or may be distributed on different servers. Irrespective of whether the micro-service repository 106, the cardless services 108, and the pairing services 110 are on the single server or on different servers, together they form a backend system. FIG. 3A is a flowchart 300 of the process for using a third party dynamic quick response (QR) code on a personal mobile device to complete a transaction at an ATM from the backend system perspective. While the disclosure used ATM to describe various embodiments, the disclosure applies to a kiosk to serve a customer, for example, to deliver a ticket and/or a boarding pass, a preordered lunch, etc.

In some embodiments, at step 302, as described above, information of the prestaged transaction may be received by the backend system, i.e., the micro-service repository 106 and/or the cardless services 108, from the UE device 102 over the secure interface 104 as described above. As described above, upon successful authorization of the prestaged transaction, the customer may be asked to go to the ATM to complete the prestaged transaction as described above.

In some embodiments, at step 304, after successful set up of the prestaged transaction on the mobile application on the UE device 102, a machine readable image 116 may be generated by the pairing service as described above. The machine readable image 116 may then be transmitted to the UE device 102. Therefore, when the customer reaches the ATM 114, the customer may pose the machine readable image 116 on the UE device before the camera 103. In some embodiments, at step 304, the prestaged transaction may be determined based on receiving additional scanned images from the display on the UE device and scanned by the camera 103. By way of non-limiting example, the prestaged transaction may be identified based on not just a single machine readable image 116 displayed on the UE device 102, but the prestaged transaction may be identified based on a series of different machine readable images displayed on the UE device 102.

In some embodiments, at step 306, the ATM 114 may send an API message(s) to the backend system. The API message(s) from the ATM 114 may include the machine readable image 116 scanned by the camera 103 and the ATM identifier assigned to the ATM 114 by the pairing service 110.

In some embodiments, at step 308, based on the received image from the ATM 114 in the API message(s) at step 306, the backend system may identify or determine previously set up and authorized the prestaged transaction. The backend system may identify the ATM, and its physical location based on the ATM identifier in the API message(s) received at step 306.

In some embodiments, at step 310, the backend system may authorize the prestaged transaction again. The reauthorization may be to verify that the prestaged transaction would be successful under any changed circumstances since the prestaged transaction was set up and authorized.

In some embodiments, at step 312, upon identifying the ATM at which the customer is present to complete the prestaged transaction identified at step 306, the backend system may send appropriate API message(s) to the ATM, which in our example is ATM 114. The API message(s) to the ATM 114 may be to dispense money according to the authorized prestaged transaction. The API message(s) to the ATM 114 may be to deposit cash at the ATM 114.

Figure 3B:
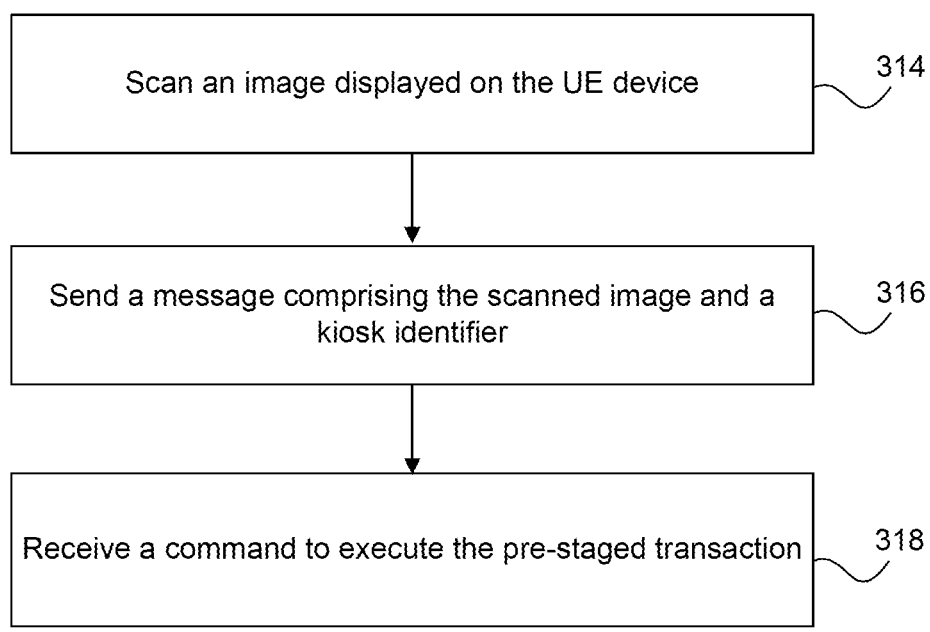
FIG. 3B illustrates a flowchart of a process for using a third party dynamic quick response (QR) code on a personal mobile device to complete a transaction at an ATM according to an embodiment.

FIG. 3B illustrates a flowchart 300 of a process for using a third party dynamic quick response (QR) code on a personal mobile device to complete a transaction at an ATM according to an embodiment. Particularly, FIG. 3B shows a flowchart 300 of the process for using a third party dynamic quick response (QR) code on a personal mobile device to complete a transaction at an ATM from the ATM 114 perspective. The step numbers do not indicate an order in which the method step occurs. At step 314, when the customer poses the machine readable image 316 on the UE device 102 before the camera 103, the ATM 114 may scan the machine readable image 316 displayed on the UE device using the camera 103. At step 316, the ATM 114 may send an API message(s) to the backend system. The API message(s) sent from the ATM 114 may include the scanned image and an ATM identifier assigned to the ATM 114 by the pairing server 110 as described above. After successful verification of the details received in the API message(s) from the ATM 114 at step 316, the backend system may send an appropriate command using an API message(s) to the ATM 114 to complete the prestaged transaction as shown in FIG. 3B at step 318.

Figure 3C:
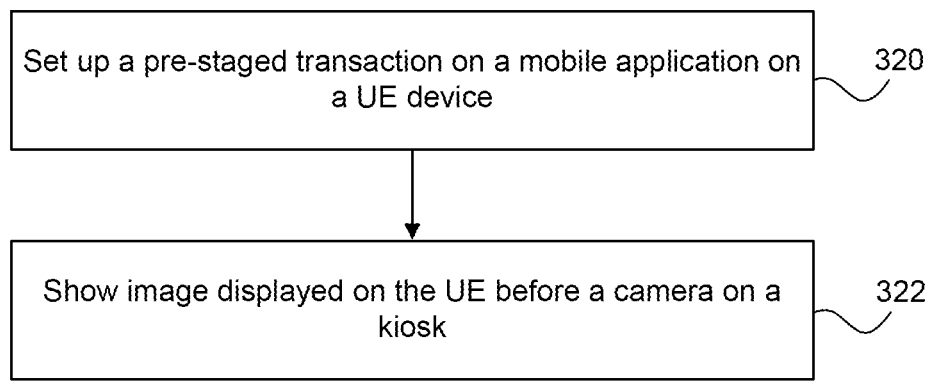
FIG. 3C illustrates a flowchart of a process for using a third party dynamic quick response (QR) code on a personal mobile device to complete a transaction at an ATM according to an embodiment.

FIG. 3C illustrates a flowchart 300 of a process for using a third party dynamic quick response (QR) code on a personal mobile device to complete a transaction at an ATM according to an embodiment. Particularly, FIG. 3C shows a flowchart 300 of the process for using a third party dynamic quick response (QR) code on a personal mobile device to complete a transaction at an ATM from the customer or UE device 102 perspective. The step numbers do not indicate an order in which the method step occurs. At step 320, the customer using the mobile application installed on the UE device 102 may set up the prestaged transaction. The prestaged transaction may be authorized, and the customer may be shown a message on the UE device 102 to visit an ATM to complete the prestaged transaction as described above. At step 322, the customer may visit an ATM, for example, the ATM 114, and may pose the machine readable image displayed on the display of the UE device 102 before the camera 103 to complete the prestaged transaction. The machine readable image 116 may be scanned and sent in the API message(s) to the backend system by the ATM 114, as described above. The backend system may then send the API message(s) to the ATM 114 to complete the authorized prestaged transaction.

Figure 4:
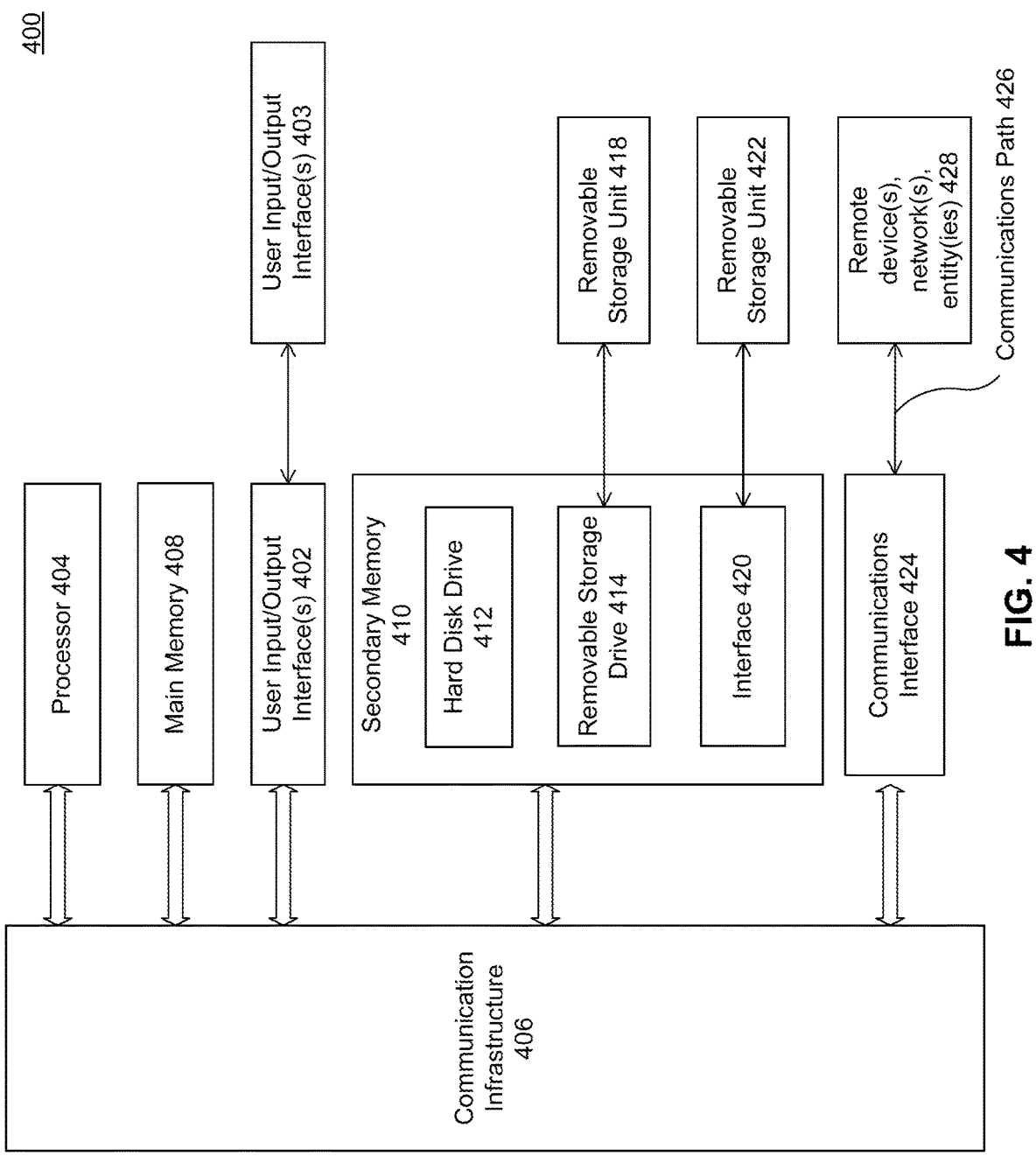
FIG. 4 illustrates an exemplary computer system according to an embodiment.

FIG. 4 illustrates an exemplary computer system according to an embodiment.

Various embodiments may be implemented, for example, using one or more well-known computer systems, such as a computer system 400, as shown in FIG. 4. One or more computer systems 400 may be used, for example, to implement any of the embodiments discussed herein, as well as combinations and sub-combinations thereof. The computer systems 400 may be used for the micro-service repository 106, the cardless services 108, and/or the pairing service 110 described above.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 408 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive.

The removable storage drive 414 may interact with a removable storage unit 418. The removable storage unit 418 may include a computer-usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to the removable storage unit 418.

The secondary memory 410 may include other means, devices, components, instrumentalities or other approaches for allowing computer programs and/or other instructions and/or data to be accessed by the computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
receiving, by one or more computing devices, a message from a kiosk, wherein the message comprises an image from a display on a user equipment (UE) device as scanned by a camera on the kiosk, and a kiosk identifier for the kiosk, wherein the image is associated with a prestaged transaction;
associating, by the one or more computing devices, the prestaged transaction with the kiosk, wherein the prestaged transaction is determined based on the scanned image in the message, and wherein the kiosk is determined based on the kiosk identifier in the message; and
sending, by the one or more computing devices, a command to the kiosk based on the kiosk identifier to execute the prestaged transaction.

2. The method of claim 1, further comprising:
comparing a physical location of the UE device with a physical location of the kiosk; and
rejecting the prestaged transaction in response to the physical location of the UE device not matching with the physical location of the kiosk.

3. The method of claim 2, wherein the physical location of the kiosk is determined based on the kiosk identifier.

4. The method of claim 1, wherein the prestaged transaction is further determined based on receiving, by the one or more computing devices, from the kiosk a plurality of additional images from the display on the UE device as scanned by the camera on the kiosk and the kiosk identifier.

5. The method of claim 1, further comprising:
authorizing, by the one or more computing devices, the prestaged transaction based on comparison of an owner of the phone number associated with the UE device to be same as an owner of an account associated with the prestaged transaction.

6. The method of claim 1, further comprising:
in response to a failure in executing the prestaged transaction, sending, by the one or more computing devices, a notification on a mobile application of a mobile device of an agent to assist with the prestaged transaction.

7. The method of claim 1, further comprising:
in response to a failure in executing the prestaged transaction, displaying, by the one or more computing devices, a help message on a display of the kiosk to complete the prestaged transaction.

8. The method of claim 1, further comprising:

authorizing, by the one or more computing devices, the prestaged transaction based on performing a two-factor authentication with a phone number associated with an account of the prestaged transaction.

9. The method of claim 1, further comprising:

in response to a determination that the prestaged transaction is outside of a preset policy boundary, overriding, by the one or more computing devices, the preset policy to authorize the prestaged transaction based on verification of information associated with an account of the prestaged transaction.

10. A system, comprising:

a memory for storing instructions; and one or more processors, communicatively coupled to the memory, configured to execute the instructions, the instructions causing the one or more processors to:

receive a message from a kiosk, wherein the message comprises an image from a display on a user equipment (UE) device as scanned by a camera on the kiosk, and a kiosk identifier for the kiosk, and wherein the image is associated with information of a prestaged transaction;

associate the prestaged transaction with the kiosk, wherein the prestaged transaction is determined based on the scanned image in the message, and wherein the kiosk is determined based on the kiosk identifier in the message; and send a command to the kiosk based on the kiosk identifier to execute the prestaged transaction.

11. The system of claim 10, wherein the one or more processors are further configured to:

compare a physical location of the UE device with a physical location of the kiosk; and reject the prestaged transaction in response to the physical location of the UE device not matching with the physical location of the kiosk, wherein the physical location of the kiosk is determined based on the kiosk identifier.

12. The system of claim 10, wherein to determine the prestaged transaction, the one or more processors are further configured to receive from the kiosk a plurality of additional images from the display on the UE device as scanned by the camera on the kiosk and the kiosk identifier.

13. The system of claim 10, wherein the one or more processors are further configured to:

authorize the prestaged transaction based on comparison of an owner of the phone number associated with the UE device to be same as an owner of an account associated with the prestaged transaction.

14. The system of claim 10, wherein the one or more processors are further configured to:

in response to a failure in executing the prestaged transaction, send a notification on a mobile application of a mobile device of an agent to assist with the prestaged transaction.

15. The system of claim 10, wherein the one or more processors are further configured to:

in response to a failure in executing the prestaged transaction, display a help message on a display of the kiosk to complete the prestaged transaction.

16. The system of claim 10, wherein the one or more processors are further configured to:

authorize the prestaged transaction based on performing a two-factor authentication with a phone number associated with an account of the prestaged transaction.

17. The system of claim 10, wherein the one or more processors are further configured to:

in response to a determination that the prestaged transaction is outside of a preset policy boundary, override the preset policy to authorize the prestaged transaction based on verification of information associated with an account of the prestaged transaction.

18. The system of claim 10, wherein the one or more processors are further configured to:

unlock a feature of the mobile application at the UE device based on verification of information associated with an account of the prestaged transaction.

19. A non-transitory, tangible computer-readable device having instructions stored thereon that, when executed by at least one computing device, causes the at least one computing device to perform operations comprising:

receiving a message from a kiosk, wherein the message comprises an image from a display on a user equipment (UE) device as scanned by a camera on the kiosk, and a kiosk identifier for the kiosk, and wherein the image is associated with information of a prestaged transaction;

associating the prestaged transaction with the kiosk, wherein the prestaged transaction is determined based on the scanned image in the message, and wherein the kiosk is determined based on the kiosk identifier in the message; and sending a command to the kiosk based on the kiosk identifier to execute the prestaged transaction.

20. The non-transitory, tangible computer-readable device of claim 19, wherein operations further comprise:

comparing a physical location of the UE device with a physical location of the kiosk; and rejecting the prestaged transaction in response to the physical location of the UE device not matching with the physical location of the kiosk, wherein the physical location of the kiosk is determined based on the kiosk identifier.

* * * * *